United States Patent [19]

Sander

[11] Patent Number: 4,827,461
[45] Date of Patent: May 2, 1989

[54] UNIVERSAL TELECOMMUNICATIONS AUDIO COUPLING DEVICE

[75] Inventor: Willy M. Sander, Stamford, Conn.

[73] Assignee: Dictaphone Corporation, Stratford, Conn.

[21] Appl. No.: 97,901

[22] Filed: Sep. 17, 1987

[51] Int. Cl.$^4$ .......................... H04H 9/00; H04M 1/64
[52] U.S. Cl. ............................................ 369/7; 379/68; 360/67
[58] Field of Search ................... 369/7, 6, 20; 360/67; 379/67, 68

[56] References Cited

U.S. PATENT DOCUMENTS

| | | | |
|---|---|---|---|
| 4,305,101 | 12/1981 | Yarbrough et al. | 369/7 X |
| 4,384,308 | 5/1983 | Yanagida | 360/8 |
| 4,542,427 | 9/1983 | Nagai | 360/72.1 |
| 4,570,190 | 2/1986 | Kitoh | 360/73 |
| 4,580,179 | 4/1986 | Sakaguchi et al. | 360/69 |
| 4,625,081 | 11/1986 | Lotito et al. | 379/88 |

OTHER PUBLICATIONS

Racal Recorders I.C.R. 64 Voice Communications Recorder.

Primary Examiner—Robert L. Richardson
Attorney, Agent, or Firm—Robert H. Whisker; David E. Pitchenik; Melvin J. Scolnick

[57] ABSTRACT

Input coupling apparatus for coupling a telecommunications link, such as a telephone line, to an audio device, such as a recording channel of a telecommunications logger. Input terminals connect the coupling apparatus to the telecommunications link, such as to the tip and ring leads of a telephone line, for receiving audio signals. Voltage, current and remote sensing devices are coupled to the input terminals for detecting an active mode, such as an off-hook condition, during which audio signals are present. When connected to a telephone line, either an off-hook voltage condition or an off-hook current flow is sensed to produce an off-hook signal. When coupled to another communications link, such as a radio link, an external, simulated off-hook signal is detected. A selector is coupled to the voltage, current and remote sensing devices and selects one of those devices to supply the off-hook signal to the audio device, for example, to enable a logger to record audio signals. An audio amplifier is coupled to the input terminals for applying received audio signals to the audio device (e.g. to apply those signals to the recording channel of a logger).

19 Claims, 3 Drawing Sheets

UNIVERSAL TELECOMMUNICATIONS AUDIO COUPLING DEVICE

BACKGROUND OF THE INVENTION

This invention relates to input coupling apparatus and, more particularly, to a universal input coupling device which finds particular utility in the environment of a telecommunications logger to permit signals received over different types of telephone lines or external communications links (e. g. a radio link) to be recorded. As will become apparent from the description below and from the appended claims, the present invention is not intended to be limited solely to the field of telecommunications loggers.

In various applications, it is desired to receive audio or other information signals from divers sources and over different types of telecommunications links. For example, such audio or other information signals may be recorded, may be relayed, may be broadcasted or may be otherwise processed. In one particular application, such audio signals are recorded for verification, confirmation or other purposes at a time subsequent to the recording thereof. So-called communications recorders, also known as telecommunications loggers, comprise one type of such audio devices.

As is known, a conventional telecommunications logger (sometimes referred to hereinafter simply as a "logger") is comprised of a multi-channel audio recording device, in which individual recording channels are coupled to respective tracks on a magnetic recording medium, such as a magnetic tape, for the recording of audio signals. Several, and even all, of these recording channels may be "active" simultaneously to record individual conversations in respective recording tracks. On the other hand, as few as one single recording channel may be active at any given time. The magnetic medium may be advanced when any one or more channels is active and stopped only when all input channels are inactive. In other applications, the medium is continuously advanced twenty-four hours each day.

A typical use of a conventional telecommunications logger is to record emergency information that may be communicated to, for example, a police station, a fire station, a medical emergency unit, or the like. In such an environment, each recording channel may be coupled to a respective telecommunications link to receive and record audio (or other information) signals communicated over that link. For example, several recording channels may be connected to respective ones of many incoming telephone lines provided at the recording station (e. g. incoming telephone lines at a police station). In the likely event that emergency information is communicated over other communications links, such as a radio link, a dedicated hard-wired line, or the like, such additional communication links also are coupled to respective recording channels.

When a police department, as an example, acquires a telecommunications logger, the particular recording channels which are to be connected to telephone lines and those which are to be connected to other communications links normally are specified in advance of installation. When the logger initially is set up and configured at the police station, the specific recording channels that are to be connected to the telephone lines and to the other communication links then are identified. Often, on-site changes must be made quickly to accommodate changes in plans, configurations and intended uses of the logger. Often, this requires the particular expertise of highly skilled technicians and, as is apparent, is significantly labor intensive.

An essential element in the operation of a typical telecommunications logger is that an incoming audio signal is recorded automatically and without manual initiation by an operator. This ensures that emergency information is recorded quickly, promptly and accurately. Most emergency information is received in response to incoming telephone calls or radio transmission initiated at a remote location. It is important, then, that an incoming telephone call be answered automatically and that the resultant off-hook condition of a telephone line which has been answered be detected. However, the detection of such off-hook conditions generally varies as a function of the type of telephone system then in use.

For example, in one type of telephone system, an off-hook condition (i. e. the "answering" of an incoming telephone call) is accompanied by a change in the voltage level at the usual tip and ring leads of a telephone line. While this change in tip and/or ring voltage may be detected without difficulty, it often happens that the off-hook voltage levels used in one telephone system differ from those used in another. For this reason, an off-hook condition often is detected by sensing current flow in the telephone line. However, current sensing circuitry, although conventional, usually is connected in series with the tip and/or the ring lead; and this generally requires the leads to be spliced for insertion of the current sensing circuit. Such telephone line splicing may be an accommodation furnished by the telephone utility which, in turn, provides the usual tip and ring leads, and additional "ring 1" and "tip 1" leads. In the example described below, the tip and tip 1 leads are shorted together, and the ring and ring 1 leads are connected in series; and the current sensing circuit is connected between the ring and ring 1 leads.

Still further, if the recording channel of the logger is to be connected to another communications link, such as a radio link, the radio communications device may be provided with a pair of terminals that provide the audio signals analogous to those present on the tip and ring leads of a telephone line, together with another terminal upon which a simulated off-hook signal generally is known as a "remote start" signal which, when present, indicates the presence of audio signals to be recorded.

The signal levels on different telephone lines may vary in intensity, usually as a function of the length of the telephone line which extends to the logger. In some locations, the signal strength associated with all of the telephone and other communication lines may be relatively high; whereas in other locations, those signals strengths may be relatively low. Still further, in any given location, the signal strengths on some lines may exceed the signal strengths on others. To compensate for these different signal levels, different signal gains or attenuations may be needed for the different recording channels. As is apparent, such "normalization" of signal levels may vary from one logger to another and even from one recording channel to another in the same logger.

Heretofore, each recording channel in a logger, or each input interface to that recording channel, has been "customized" to accommodate the different conditions expected in that channel. Thus, if a particular channel was connected to a telephone line, either a voltage sensing circuit or a current sensing circuit would be provided in the input interface. If that particular channel was to be connected to another communications link, such as a radio device, then a "remote start" sensor would be provided in the input interface. Still further, if the level of the audio signal supplied to the recording channel is relatively high, then the input interface would be provided with an attenuator of proper attenuation level. This attenuation level might vary from one recording channel to another. In any event, it is appreciated that the particular configuration of the various input interfaces in a logger has been quite time-consuming and expensive. Furthermore, if servicing had been required for that logger, the specific configuration of the different input interfaces would have to be known and accounted for.

The present invention overcomes the aforenoted difficulties.

OBJECTS OF THE PRESENT INVENTION

Therefore, it is an object of the present invention to provide a universal input interface for coupling a telecommunications link to an audio device which overcomes the aforenoted difficulties, disadvantages and defects.

Another object of this invention is to provide a universal input interface for connecting a telecommunications logger to either telephone lines or other communications links.

A still further object of this invention is to provide a universal input interface which connects the various recording channels of a multi-channel telecommunications logger to respective telecommunications links, the input interface being substantially compatible with virtually all telecommunications links that are contemplated, such as telephone lines and radio receiver and/or transmitter devices.

An additional object of this invention is to provide coupling apparatus that is provided with voltage sensing, current sensing and remote start sensing devices, all of which provide indications of an active mode during which audio signals are present on the telecommunications link connected thereto.

Yet another object of this invention is to provide coupling apparatus of the aforementioned type wherein selector means are provided to select a desired one of the voltage, current or remote start sensing devices.

A still further object of this invention is to provide a universal coupling device of the aforementioned type, which includes circuitry capable of accommodating various types of telecommunications links.

Another object of this invention is to provide a universal coupling apparatus of the aforementioned type in which different audio signal levels may be accommodated to provide an essentially "normalized" signal level.

Various other objects, advantages and features of the present invention will become readily apparent from the ensuing detailed description, and the novel features will be particularly pointed out in the appended claims.

SUMMARY OF THE INVENTION

In accordance with this invention, coupling apparatus is provided for coupling a telecommunications link to an audio device. In the preferred embodiment, the coupling apparatus comprises universal input apparatus for use with a telecommunications logger and functions to couple audio signals that may be received over telephone lines or over another communications link (such as a radio link) to a recording channel of that logger. Input terminals are adapted to be connected to the telecommunications link, such as to the tip and ring leads of a telephone line or to the leads of another communications link, for receiving audio signals. Voltage, current and remote start sensing devices all are connected to the input terminals for sensing an active mode during which audio signals are present on the telecommunications link. When connected to a telephone line, an off-hook voltage condition (i. e. an active mode) is sensed by a voltage sensing device or an off-hook current flow is sensed by the current sensing device. An external active signal, such as a remote start signal which simulates a telephone off-hook signal may be sensed by the remote sensing device. A selector is coupled to the voltage, current and remote sensing devices for selecting a desired one of those devices to supply to the audio device a command signal when audio signals are present. In the preferred embodiment, the command signal is an off-hook signal and is used as a record command signal to enable the recording means of the logger to record the audio signals which are present. An audio amplifier is coupled to the input terminals for applying received audio signals to the audio device.

In one embodiment, the selector comprises a switching device for connecting the voltage, current or remote sensing device to the audio device. As one aspect, this selector switch comprises a jumper connector having a common output, plural inputs coupled to the voltage, current and remote sensing devices, and a jumper lead for connecting the common output to a desired one of these inputs.

In a specific embodiment, the voltage-sensing device comprises an analog gate coupled by the input terminals to the tip and ring leads of a telephone line for gating the more positive voltage present on the ring and tip leads, and a comparator for comparing the gated voltage to a reference voltage to produce a signal indicative of an active mode (e. g. an off-hook signal or a logger record command signal) when the gated voltage is less than the reference voltage.

As another feature of the present invention, the audio amplifier includes an audio signal level selector for selecting a desired audio signal gain level. In the preferred embodiment, the audio signal level selector comprises an attenuator and means for selecting a desired level of attenuation.

As yet another feature, the audio amplifier comprises a mute amplifier having a mute terminal which, when supplied with a mute signal, disables the operation of the amplifier. As an aspect of this feature, the amplifier normally is muted except when an active mode on the telecommunications link is detected, whereby the normally present mute signal is removed.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF A PREFERRED EMBODIMENT

Figure 1:
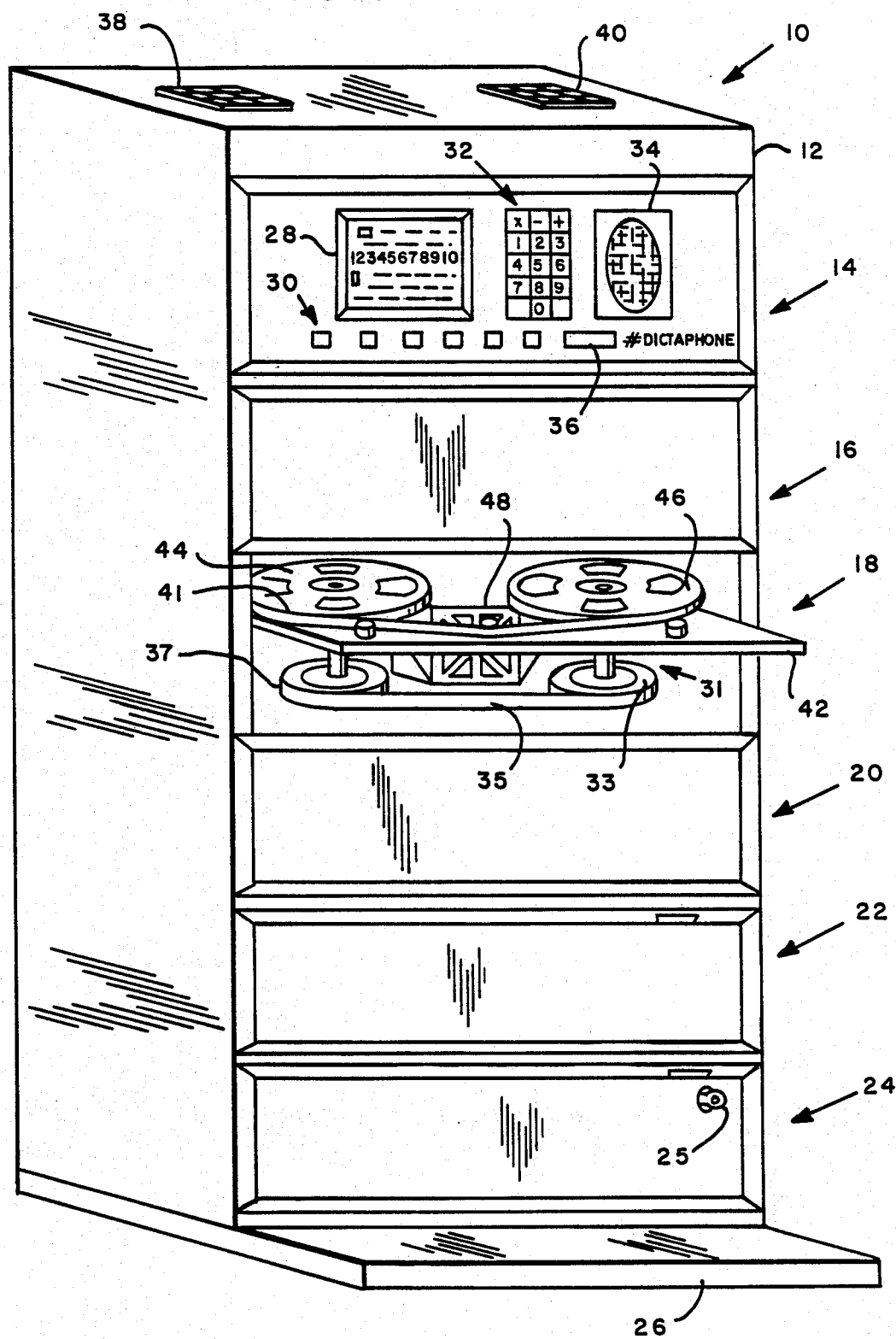
FIG. 1 is a perspective view of a telecommunications logger with which the present invention finds ready application.

FIG. 1 illustrates one embodiment of a telecommunications logger 10 with which the present invention may be used. Logger 10 includes a cabinet 12 resting on a base 26, and a plurality of different sections or "bays" 14, 16, 18, 20, 22 and 24, in which are mounted separate modules which are combined to create the logger. Each bay has a removable cover over it, except for bay 18, whose cover has been removed in order to illustrate its contents.

Uppermost bay 14 contains a controller which provides for the control of the logger, with the aid of a video monitor screen 28, a plurality of pushbutton controls 30, a keypad 32, a loudspeaker 34, and a control 36. The function of these controls is explained more fully in copending United State patent application Ser. No. 097,899, filed 9/17/87 for "Modular Configurable Communications Recorder", and will not be explained in detail here. However, the controller module includes a microprocessor and other circuitry for controlling the operation of the logger, for displaying on monitor screen 28 the status of each of many different channels in which communications signals are recorded, and for reproducing selected portions of recorded conversations or information by means of loudspeaker 34.

Bay 16 is an option bay to contain accessory equipment if needed. The user thus can expand the capabilities of the logger simply by adding another module in bay 16.

Bay 18 contains a tape deck 31. The front panel of bay 18 has been removed to show the tape deck, which has been moved out on slides (not shown) to give access to the tape deck equipment.

Bay 20 contains an optional second tape deck. If desired, for example, tape deck 31 can use relatively narrow magnetic tape, and the optional tape deck included in bay 20 can use relatively wider tape so as to record communications from many more channels than tape deck 31. Tape deck 31 may be used as a "back-up" recorder.

Bay 22 contains recording amplifier equipment, and bay 24 contains the power supply for logger 10. A key-operated on/off switch 25 is provided to enable the user of the logger to limit those who are able to turn the logger on and off. This tends to prevent unwanted disablement of the logger.

Still referring to FIG. 1, tape deck 31 includes a base plate 42, two tape reels 44 and 46, a plurality of recording/reproducing heads 48, and magnetic tape 41. Two flywheels 33 and 37 are joined by a drive belt 35. Flywheels 33 and 37 drive capstans which move the magnetic tape past the heads for recording and reproducing.

In operation, a plurality of communications lines such as telephone lines or other communications links are connected to logger 10, by means not shown, and all incoming or outgoing calls on the lines are recorded on one of the tape decks included in the logger. The tape decks typically run continuously or for long periods of time during each day so that they record all sounds transmitted over each of the communications lines at all times or during a large portion of each day. This is valuable in providing a record of emergency calls and other valuable information which otherwise might be lost if it were not recorded.

Due to the fact that calls from many communications channels are recorded in very closely spaced tracks on a single magnetic tape, the tape recording and reproducing equipment must be highly accurate in order to keep the tape in proper alignment with the recording-/reproducing heads. The logger records and reproduces sound at a very slow speed, and yet is capable of rewinding and moving the tape in a fast-forward mode very rapidly, thus facilitating the rapid handling of the relatively large quantities of tape which usually are used.

Reference is made to the above-mentioned copending application for description of various aspects and features of logger 10.

Figure 2:
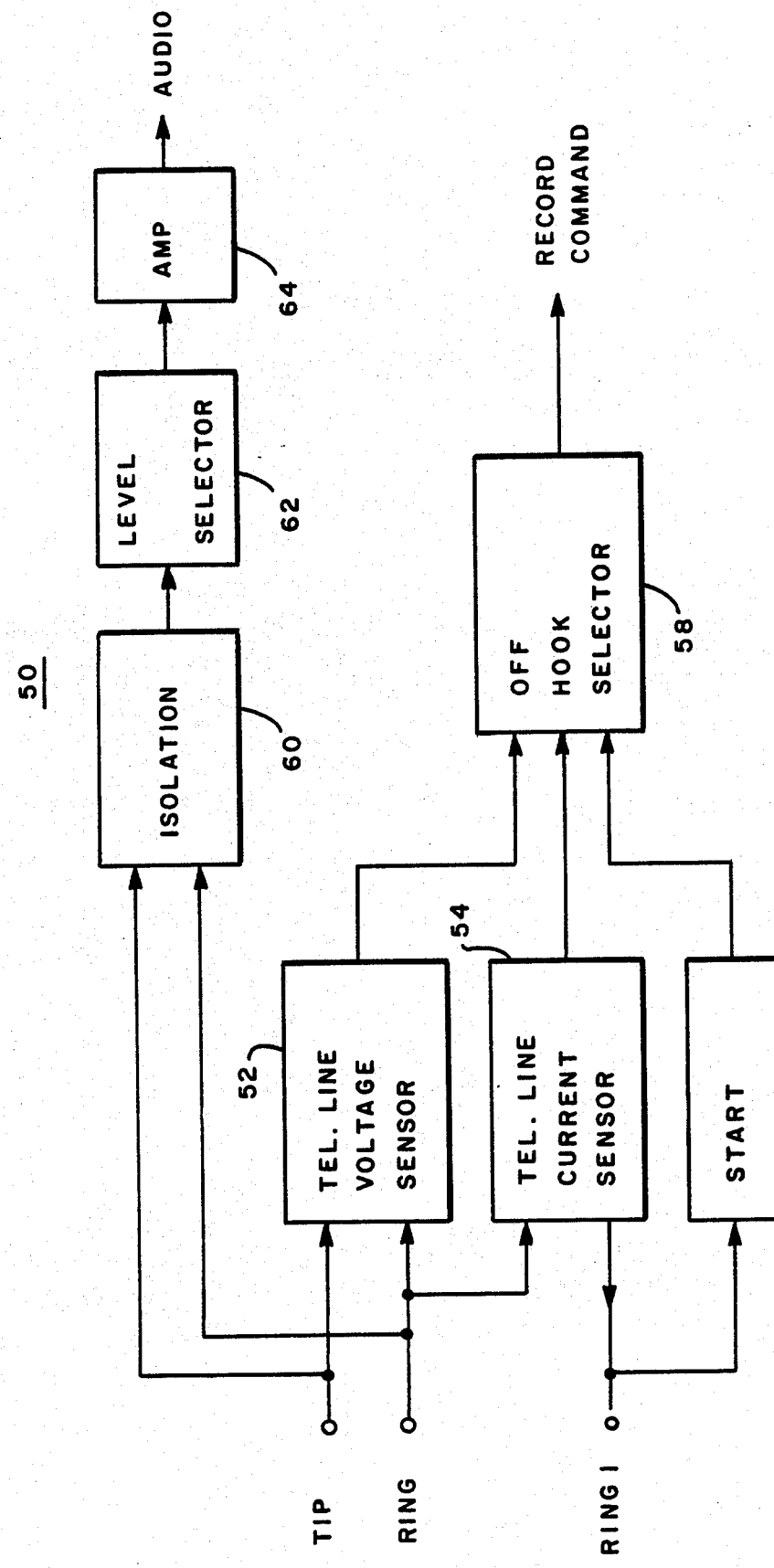
FIG. 2 is a block diagram of a preferred embodiment of this invention.

FIG. 2 is a block diagram representing coupling apparatus for coupling audio signals that may be received over a telephone line or over another communications link to a recording channel of the telecommunications logger shown in FIG. 1. As mentioned above, the present invention need not be limited solely to the environment of a telecommunications logger; and it is intended that the coupling apparatus shown in FIG. 2 admits of broader application. In particular, this coupling apparatus advantageously operates as a universal input interface for supplying audio or other information signals received from a remote source to a monitoring device. However, to simplify the present description and facilitate an understanding of this invention, the illustrated coupling apparatus is described in the environment of supplying audio signals to a recording channel of the telecommunications logger (shown in FIG. 1), which audio signals are received from a telecommunications link such as a telephone line, a radio link or other communications channel. Furthermore, it will be appreciated that the audio signals which are supplied to the recording channel are recorded by the logger. Moreover, these audio signals typically are two-way conversation signals, usually between a remote party, such as one who is calling in emergency information, and a local operator, such as a police attendant, a fire department attendant, a medical emergency attendant, or the like.

FIG. 2 illustrates coupling apparatus referred to herein as an input coupler 50. In the preferred environment in which input coupler 50 provides a universal input interface for a telecommunications logger, the illustrated input coupler represents merely one of several interface channels, each channel being connected to a respective recording channel of the logger. Preferably, multiple interface channels, each being substantially identical to input coupler 50, are provided on a single printed circuit board, designated an interface card, thereby interfacing the several recording channels of the logger with respective telecommunications links. As a numerical example, ten input couplers may be provided on a single interface card.

Input coupler 50 is provided with input terminals identified as "tip", "ring" and "ring 1" terminals. These input terminals are adapted to be connected to corresponding tip, ring and ring 1 leads of a telephone line. The ring 1 input terminal shown in FIG. 2 is provided for the purpose of connecting a current sensor 54 to the telephone line or, alternatively, to connect a remote start sensor 56 to the telecommunications link. As is known by those of ordinary in the telephony art, a current sensor typically is connected in series with the tip lead and/or the ring lead of a telephone line. Thus, to accommodate a current sensor, the telephone utility generally will splice the ring lead; and the open-circuited splice is presented as the ring and ring 1 terminals to which current sensor 54 is connected. Alternatively, the tip lead may be spliced and presented as the tip and tip 1 terminals.

In the event that input coupler 50 is to be coupled to a communications link other than a telephone line, that communications link is connected across the tip and ring input terminals shown in FIG. 2. As an example, a radio receiver and/or transmitter (such as a transceiver) device may be connected to the tip and ring input terminals, thereby supplying radio-transmitted audio signals for recording by the logger. In that event, the presence of audio signals provided by the radio device may be indicated by a so-called remote start, or external start, signal which will be applied to the ring 1 input terminal. As will be described below, radio communications may proceed in the so-called VOX mode in the absence of a remote start signal.

Input coupler 50, as illustrated, is comprised of a telephone voltage sensor 52, a telephone current sensor 54, a remote start circuit 56, an off-hook selector 58 and an audio amplifier 64. Telephone voltage sensor 52 is coupled to the tip and ring input terminals and is adapted to sense a voltage on either of these input terminals indicative of an active mode during which audio signals are present on the telephone line connected to these terminals. Telephone current sensor 54 is coupled to the ring and ring 1 input terminals and is adapted to sense a current flow on the ring lead of a telephone line connected to coupler 50. Telephone voltage sensor 52 and telephone current sensor 54 are coupled to off-hook selector 58 which, preferably, is manually operated to select either of these sensors to provide an off-hook indication representing the active mode of the telephone line. Thus, it is seen that sensors 52 and 54 provide universal compatibility with virtually any type of telephone line; and selector 58 is used to select a desired one of these sensors, depending upon the accuracy with which each detects an off-hook (or active) condition. Off-hook selector 58 couples the off-hook signal from the selected voltage or current sensor to the recording channel connected thereto in the logger. As will become apparent, this off-hook signal, which indicates the presence of audio signals for recording, is used as a record command signal in the logger.

Remote start circuit 56 also is coupled to off-hook selector 58 and is adapted to supply thereto a simulated off-hook signal. Stated otherwise, an external active signal may be applied to the ring 1 input terminal, such as when a communications link other than a telephone line is connected to the tip and ring input terminals, thereby indicating the presence of audio signals on this communications link. The external active signal, which also is known as a "remote start" signal, may be supplied as a record command signal to the logger by off-hook selector 58. Thus, when audio signals are provided at the tip and ring input terminals, whether from a telephone line or other communications link connected thereto, a record command signal may be supplied to the logger. Off-hook selector 58 clearly provides easy selection of the appropriate off-hook signal produced by the voltage, current or remote start sensors, thereby obviating any need to provide custom configuration of input coupler 50. That is, there is no need to remove one type of off-hook sensor in favor of another because all of the contemplated sensors are provided in the coupler itself.

Audio amplifier 64 is coupled to the tip and ring input terminals by means of an isolation circuit 60 and a signal level selector 62. The isolation circuit is adapted to provide DC isolation between the audio amplifier and the tip and ring input terminals, proper termination and longitudinal balance as normally required by regulatory agencies. Hence, DC isolation is provided between a telephone line and the amplifier. As will be shown below, in the preferred embodiment, isolation circuit 60 is comprised of a capacitor-coupled audio transformer.

As mentioned above, it is expected that, depending upon the length of a telephone line connected to input coupler 50 or the type of other communications link to which the input coupler may be connected, the audio signals supplied to audio amplifier 64 may vary significantly in signal strength. It is expected, for example, that the audio signal level may vary from +20 dBm to −10 dBm. Signal level selector 62 is adapted to accommodate these different signal strengths. In a preferred embodiment, and as described more particularly with respect to FIG. 3, the signal level selector preferably comprises a selectable attenuator providing different levels of attenuation. For example, signal strengths of −10 dBm, 0 dBm, +10 dBm and +20 dBm may be selected. As a further example, signal level selector 62 may comprise a voltage divider having several output (or divider) taps, any one of which may be selected to provide the desired level of attenuation. As an alternative, the signal level selector may comprise a variable gain amplifier. It is preferred, however, to construct the signal level selector as an adjustable attenuator, as aforesaid. Audio amplifier 64 preferably comprises a mute amplifier having a mute terminal which, when supplied with a mute signal, functions to disable the operation of the amplifier. That is, in the presence of the mute signal, audio signals are not supplied by the audio amplifier to the recording channel of the logger. The mute signal normally is applied to the audio amplifier except when an active condition is detected at the tip and ring input terminals, as represented by the off-hook (or record command) signal provided by off-hook selector 58. When the off-hook (or record command) signal is produced, the mute signal is terminated, thereby enabling audio amplifier 64 to supply audio signals to the recording channel of the logger.

In use, the tip and ring input terminals of input coupler 50 are connected either to a telephone line or to some other communications link. Generally, it will be known if an off-hook condition, or active mode, can be detected by sensing an off-hook voltage on the tip or ring lead of the telephone line. If so, off-hook selector 58 selects telephone voltage sensor 52 to supply an off-hook signal as the record command signal. However, if an off-hook condition cannot be detected accurately by sensing an off-hook voltage, as sometimes may be the case, then the ring 1 input terminal of the input coupler 50 is connected to the ring 1 lead which normally will be provided by the telephone utility. Off-hook selector 58 then is preset to couple the off-hook signal produced by telephone current sensor 54 as the record command signal. As an example, the telephone current sensor may comprise a Model LDA200 current sensor, a current sensing relay, or other conventional devices known to those of ordinary skill in the art.

However, if input coupler 50 is connected to another communications link, such as a radio receiver and/or transmitter, an external active signal normally will be supplied to the ring 1 input terminal by a conventional circuit (not shown) whenever that other communications link is active. Hence, when coupler 50 is connected to this other communications link, off-hook selector 58 selects remote start circuit 56 to supply the external active signal as the record command signal.

It is anticipated that, during the initial set-up of input coupler 50, signal level selector 62 is preset to select the desired level of attenuation to accommodate the expected signal strength of the audio signals supplied to the tip and ring input terminals. As mentioned above, and in the preferred embodiment, the signal level selector may be set to provide −10 dBm, 0 dBm, +10 dBm or +20 dBm. attenuation.

Once input coupler 50 is initialized in the manner described above, an active mode in which audio signals are present at the tip and ring input terminals is represented by an off-hook signal produced by a particular sensor which has been selected by off-hook selector 58. This off-hook signal is supplied to the recording channel of the logger as a record command signal, thereby enabling that recording channel to record the audio signals which are present. These audio signals are level-adjusted by signal level selector 62 and then amplified by audio amplifier 64. After amplification, the audio signals are supplied to the recording channel of the logger for recording on the magnetic medium.

The input coupler shown as the block diagram in FIG. 2 now will be described in greater detail in conjunction with the schematic diagram illustrated in FIG. 3. It is seen that like reference numerals are used in FIG. 3 to identify the circuits which have been discussed previously with respect to FIG. 2.

Telephone voltage sensor 52 is comprised of an analog OR gate formed of diodes 110 and 112 coupled by resistors 102 and 106 to the tip and ring input terminals, respectively. As a numerical example, resistors 102 and 106 may exhibit a resistance value on the order of 10 megohms and provide a relatively high impedance to the input terminals. Resistor 102 is additionally connected to a resistor 104 to form a voltage divider circuit therewith. Similarly, resistor 106 is connected to a resistor 108. Resistors 104 and 108 each may exhibit a resistance on the order of about 5.1 megohms. Each of these voltage divider circuits is supplied with an operating potential +V, which may be on the order of about 12 volts, generated by a suitable power supply (not shown).

The cathodes of diodes 110 and 112 are connected in common and are adapted to supply to this common connection a voltage derived from whichever voltage at the tip and ring input terminals is more positive. Diodes 114 and 116 are connected in series between the source of operating potential +V and a reference potential, such as ground, the common connection of these diodes being coupled to the common-connected cathodes of diodes 110 and 112. It will be appreciated that diodes 114 and 116 limit the positive and negative values of the voltage gated by diodes 110 and 112.

The common-connected cathodes of diodes 110 and 112 are connected to the non-inverting input of an amplifier 120 by way of a coupling resistor 118. The inverting input of amplifier 120 is coupled to a threshold reference voltage which, as an example, may be on the order of about +2.5 volts. Amplifier 120 functions as a comparator; and it will be appreciated that, if the voltage supplied to the non-inverting input thereof exceeds 2.5 volts, a relatively positive output voltage is produced. However, if the voltage gated by diodes 110 and 112 is less than 2.5 volts, a relatively negative voltage (or merely ground potential) is produced by the amplifier.

Current sensor 54 preferably is conventional, as mentioned above and, thus, is shown in FIG. 3 as merely a block representative of this known circuit. Current sensor 54 is seen to be connected in series between the ring and ring 1 input terminals, the ring 1 input terminal being coupled to the current sensor by means of remote start circuit 56. Although the remote start sensor may be formed as a selector switch, in the preferred embodiment shown in FIG. 3, the remote start circuit is constructed as a jumper connector 130 having a pair of jumper positions A and B, each jumper position being formed of a pair of terminals that may be interconnected by a jumper element. As shown, the ring 1 input terminal is connected by jumper connector 130 in position A to current sensor 54. When the jumper element is placed at position B, the ring 1 input terminal is connected directly to the output of the current sensor for the purpose of supplying the aforementioned external start signal (which, it is recalled, simulates an off-hook signal).

Off-hook selector 58 may be comprised of a multi-position selector switch but, in the preferred embodiment, is illustrated as a jumper connector 140. This jumper connector is provided with a common output and individual inputs A, B and C, one of these inputs being connected to the common output by means of a selectively positionable jumper element. In the illustration shown in FIG. 3, the jumper element is connected at position A to couple input A to the common output. It is seen that the output of telephone voltage sensor 52 and, more particularly, the output of comparator 120, is connected to position A of jumper connector 140. The output of current sensor 54, as well as the output of the remote start sensor, is connected to input B of jumper connector 140. Input C of jumper connector 140 is seen to be "free", and the purpose of this "free" position will be described below.

The common output of jumper connector 140 is adapted to supply the off-hook, or record command, signal detected by the voltage current or remote start sensor to the recording channel of the logger. This common output also is coupled by means of a coupling diode 180 to audio amplifier 164, as will be described below.

Figure 3:
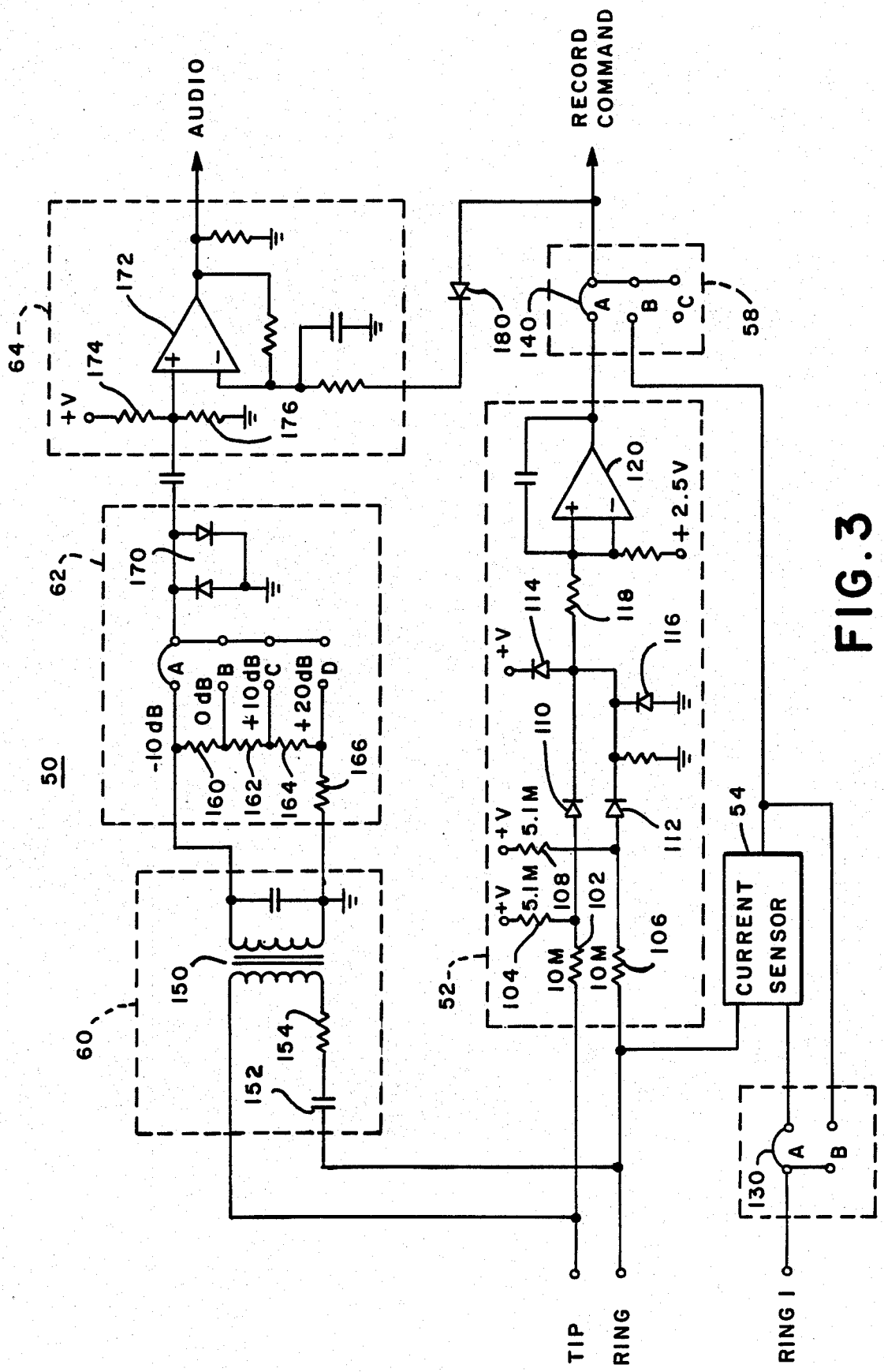
FIG. 3 is a schematic representation of the block diagram shown in FIG. 2.

Isolation circuit 60 is illustrated in FIG. 3 as being comprised of coupling transformer 150 whose primary winding is connected across the tip and ring input terminals by means of a blocking capacitor 152 and a resistor 154. The blocking capacitor serves to prevent direct current from flowing through coupling transformer 150. However, audio signals, which are AC signals, clearly are coupled to and flow through the coupling transformer.

The secondary winding of coupling transformer 150 is coupled to signal level selector 62 which, in the preferred embodiment, is illustrated as a voltage divider network. This voltage divider network is comprised of resistors 160, 162, 164 and 166 connected across the opposite ends of the secondary winding of coupling transformer 150. The junctions defined by adjacent resistors are connected to inputs A, B, C and D, respectively, of a jumper connector 168 having common-connected outputs. Depending upon the positioning of the jumper element included in jumper connector 168, a corresponding voltage divider ratio is established. As a numerical example, resistor 160 may be formed as a 6.8 kilohm resistor, resistor 162 may be formed as 2.7 kilohm resistor, resistor 164 may be formed as 680 ohm resistor and resistor 166 may be formed as a 330 ohm resistor. With these values, when the jumper element is connected at position A (that is, when it is connected to input A of jumper connector 168), minimum attenuation of the input audio signal is attained, and this input audio signal level may be thought of as a −10 dBm level. When the jumper element is located at position B, the illustrated voltage divider results in an attenuation, thereby accommodating an input audio signal of higher level, such as a 0 dBm signal. Likewise, when the jumper element is located at position C, a still further attenuation of the audio input signal is attained, thereby accommodating a +10 dBm signal. Finally, when the jumper element is located at position D, maximum attenuation is achieved, thereby accommodating a relatively higher level audio signal, such as a +20 dBm signal.

The output of jumper connector 168, that is, the common-connected outputs of positions A, B, C and D, are coupled to audio amplifier 64; and back-to-back diodes 170 are connected to the output of jumper connector 168 as limiting diodes. These diodes limit the maximum value of the signal provided at the output of the jumper connector to a range equal to the voltage drop across these diodes. It will be appreciated that this voltage is limited to a range of $2V_{be}$.

Audio amplifier 64 is comprised of an amplifier 172 having a non-inverting input coupled by means of a capacitor to jumper connector 168. Series-connected resistors 174 and 176 are coupled to the source of operating potential +V and supply a bias voltage to the non-inverting input of amplifier 172. As an example, resistors 174 and 176 may be of equal resistance, thereby supplying a bias voltage of +V/2 which, as a numerical example, may be on the order of about 6 volts.

Amplifier 172 includes an inverting input which is coupled by coupling diode 180 to the output of jumper connector 140. It is appreciated that if a positive voltage is supplied by diode 180 to the inverting input of amplifier 172, this amplifier is disabled from amlifying signals supplied to the non-inverting input thereof. That is, the amplifier is muted in response to a positive muting signal supplied by diode 180. However, in the absence of this muting signal, that is, when the output of jumper connector 140 is, for example, a negative voltage, or even ground, amplifier 172 is enabled to amplify any audio signal that might be supplied thereto. As will be described, the off-hook, or record command, signal provided at the output of jumper connector 140 generally is approximately ground potential (e. g. 0 volts), thereby enabling amplifier 172 to amplify audio signals.

In operation, let it be assumed that jumper connector 140 is located at position A. In this condition, the particular position of jumper connector 130 is unimportant. Let it be further assumed that the tip and ring input terminals of coupler 50 are connected to a telephone line. If the telephone line is inactive, that is, if it exhibits its on-hook mode, one or the other of the tip and ring leads thereof will be at approximately ground potential. It will be seen, therefore, that the voltage produced by the voltage divider formed of resistors 102 and 104 or the voltage produced by the voltage divider formed of resistors 106 and 108 will be approximately two-thirds the operating potential +V and, thus, will be on the order of about 8 volts. This voltage level is coupled by diode 110 or diode 112 to the non-inverting input of comparator 120. Since this voltage is greater than the 2.5 volt reference potential supplied to the inverting input of the comparator, comparator 120 applies a positive voltage level to jumper connector 140. This positive voltage is coupled by coupling diode 180 to the inverting input of audio amplifier 172, thereby muting this amplifier. At this time, the off-hook, or record command signal is not produced and audio signals, even if detected by the audio amplifier, are not amplified.

Now, let it be assumed that the telephone line connected to the tip and ring input terminals exhibits an active mode. Stated otherwise, it is assumed that the telephone line exhibits an off-hook condition and audio signals are present for recording. In this off-hook condition, the maximum positive voltage present at the tip or ring leads of the telephone line falls to nominally −20 volts, but in any event, below about −10 volts. Accordingly, the voltage produced at the output of the voltage divider formed of resistors 102 and 104 (or at the output of the voltage divider formed of resistors 106 and 108) is less than one volt. Hence, the voltage now applied to the non-inverting input of comparator 120 is less than the reference voltage applied to the inverting input thereof. As a result, comparator 120 supplies a relatively negative voltage (or, at most, a voltage equal to approximately ground potential) to jumper connector 140. This negative voltage (or ground potential) is used as the record command signal and represents an off-hook condition. Furthermore, this record command signal is seen to replace the mute signal that had been applied to the inverting input of amplifier 172 by coupling diode 180. The amplifier no longer is muted. Rather, it is enabled to amplify audio signals that might be applied thereto. These audio signals are, of course, supplied to the recording channel of the logger and, in the presence of the record command signals, are recorded.

Audio signals are supplied to amplifier 172 from the tip and ring input terminals by means of coupling transformer 150, the resistive voltage divider formed of resistors 160, 162, 164 and 166 and jumper connector 168. It is appreciated that the jumper element included in jumper connector 168 is located at position A, B, C or D, depending upon the input signal level of the audio signal supplied to the tip and ring input terminals. Signals exhibiting higher signal strengths are subjected to greater attenuation than those exhibiting lesser signal strengths. The level of attenuation is, of course, determined by the position of the jumper element; and this generally is established during the initial setup of input coupler 50.

Let it be assumed that an off-hook condition of the telephone line connected to the tip and ring input terminals can best be determined by sensing current flowing in the ring lead. To detect such current flow, the ring lead is spliced; and the splice is presented to input coupler 50 as the ring lead and the ring 1 lead. Input terminal ring 1 thus is connected to the ring 1 lead of the telephone line. If the jumper element included in jumper connector 130 is located at position A, as illustrated, current flows from the ring lead to current sensor 54 and then through jumper connector 130 to the ring 1 lead.

It is appreciated that current flows on the ring lead when the telephone line exhibits its active mode, that is, when the telephone line is in its off-hook condition. Current sensor 54 produces a relatively low level signal when this current flow is detected. As illustrated in FIG. 3, this low level signal is applied to input B of jumper connector 140. If the jumper element included in this jumper connector is located at position B, the low level signal produced by the current sensor is supplied to the common-connected output of jumper connector 140 and is used as the off-hook, or record command, signal. As before, this signal is used not only to enable the recording channel of the logger to record audio signals supplied thereto, but also to enable audio amplifier 172 to amplify and supply those audio signals to the logger.

If the tip and ring input terminals are connected to a non-telephonic communications channel, such as to a radio link, audio signals received over that link nevertheless are supplied to the tip and ring input terminals in the same manner as when a telephone line is connected thereto. Here, however, the active mode of that communications link no longer is detected by sensing the voltage or current at the tip or ring input terminals. Rather, it is anticipated that a remote start signal, which simulates an off-hook signal, will be applied to the ring 1 input terminal when audio signals are present on the communications link. As is recognized, this remote start, or external, signal should be a low level (or negative) signal to simulate the aforementioned off-hook, or record command, signal. Now, if the jumper element included in jumper connector 130 is located at position B, this remote start signal is coupled from the ring 1 input terminal, across position B of jumper connector 130 to the output of current sensor 154, and thence through position B of jumper connector 140. This simulated off-hook signal operates in substantially the same way to achieve substantially the same result as that produced by comparator 120 or by current sensor 54. Thus, amplifier 172 is enabled by this off-hook signal to supply audio signals to the recording channel of the logger; and this off-hook signal serves as a record command signal to enable the logger to record such audio signals.

The illustrated input coupler 50 also may operate in a voice operated control (VOX) mode. In this mode, any audio signals which are supplied to the tip and ring inputs are coupled to and amplified by amplifier 172 and supplied thereby to the record channel of the logger. Furthermore, in this VOX mode, the recording channel operates substantially independently of a record command signal produced by the coupler. As is known to those of ordinary skill in the art, in the VOX mode audio signals are recorded whenever they are present. VOX circuitry responds to such audio signals to simulate a record command signal, thereby enabling the logger to record such audio signals.

In the VOX mode, it is preferred that a mute signal not be applied to amplifier 172. This is achieved by locating the jumper element included in jumper connector 140 at position C. It is seen that input C of jumper connector 140 is "free" and is not connected to other circuitry. Thus, the relatively higher level, positive voltage that had been applied previously by jumper connector 140 to audio amplifier 172 as the mute signal no longer is applied. In the absence of the mute signal, amplifier 172 couples audio signals that might be supplied thereto to the recording channel included in the logger.

While the present invention has been particularly shown and described with reference to a preferred embodiment thereof, it will be readily appreciated by those of ordinary skill in the art that various changes and modifications may be made without departing from the spirit and scope of the invention. For example, the various jumper connectors may be replaced by simple multi-position selector switches having positions A, B and C connected in the manner illustrated by inputs A, B and C of jumper connector 140. In addition, a further position D may be included in that selector switch for receiving a remote start signal directly.

Also, signal level selector 62 need not be formed as a resistive voltage divider having individually selectable output taps, as illustrated. Rather, the signal level selector may comprise a variable gain amplifier adapted to provide a larger gain for audio signals of lesser amplitude and lesser gain for audio signals of greater amplitude. Furthermore, jumper connector 168 may be replaced by a multi-position selector switchsimilar to that mentioned above for use in place of jumper connector 140.

As yet another modification, isolation circuit 60 may be formed as an electro-optic coupling circuit to provide optical coupling and, thus, optical isolation between the tip and ring terminals and audio amplifier 64.

Still further, when the present invention is used in the environment of a communications recorder, the recording medium need not be limited solely to a magnetic medium. For example, received information may be recorded on an optical disk.

It is intended that the appended claims be interpreted as including the foregoing as well as other equivalent modifications and changes.

What is claimed is:

1. Coupling apparatus for coupling a telecommunications link to an audio device, comprising:
    input terminals for connecting to said telecommunications link;
    voltage sensing means coupled to said input terminals for sensing a voltage on said telecommunications link indicative of an active mode during which audio signals are present on said telecommunications link;
    current sensing means coupled to said input terminals for sensing current flow on said telecommunications link indicative of an active mode during which audio signals are present on said telecommunications link;
    remote sensing means for sensing an external active signal indicative of an active mode during which audio signals are present on said telecommunications link;
    selector means coupled to said voltage, current and remote sensing means for selecting a desired one of said sensing means to supply a command signal to said audio device when the voltage, current or active signal is sensed by the selected sensing means; and
    audio amplifier means coupled to said input terminals for receiving audio signals on said telecommunications link and supplying same to said audio device;
    whereby said coupling apparatus is substantially compatible with telephone lines and radio receiver and/or transmitter devices.

2. The apparatus of claim 1 wherein said telecommunications link comprises a telephone line having tip and ring leads coupled to said input terminals, and said selector means comprises switch means for connecting said voltage sensing means or said current sensing means to said audio device.

3. The apparatus of claim 2 wherein said voltage sensing means produces said command signal in response to said sensed voltage, and wherein said current sensing means produces said command signal in response to said sensed current flow.

4. The apparatus of claim 3 wherein said voltage sensing means comprises analog gating means coupled to said tip and ring leads for gating the more positive voltage present on said tip and ring leads; and comparator means coupled to said gating means for comparing the gated voltage to a reference voltage to produce said command signal when the gated voltage is less than said reference voltage, thereby indicating an active mode for said telephone line.

5. The apparatus of claim 1 wherein said telecommunications link is a radio link having a pair of leads coupled to said input terminals, and said selector means comprises switch means for connecting said remote sensing means to said audio device.

6. The apparatus of claim 5 wherein said external active signal constitutes said command signal.

7. The apparatus of claim 1 wherein said audio amplifier means includes audio signal level selecting means for selecting a desired audio signal gain level.

8. The apparatus of claim 7 wherein said audio signal level selecting means comprises attenuation selecting means for selecting a desired attenuation level.

9. The apparatus of claim 1, further comprising isolation means interconnected between said amplifier means and said input terminals.

10. The apparatus of claim 9 wherein said isolation means comprises an audio transformer and a blocking capacitor connected in series with said audio transformer.

11. The apparatus of claim 1 wherein said audio amplifier means includes a mute-controlled amplifier having a mute input for receiving a mute signal to disable said amplifier, said mute input being coupled to receive said command signal such that said amplifier is disabled in the absence of said command signal.

12. Universal input apparatus for coupling audio signals that may be received over telephone lines or over another communications link to a recording channel of a telecommunications logger, said apparatus comprising:

input terminals for connection to tip and ring leads of a telephone line or to leads of another communications link for receiving audio signals;

voltage sensing means coupled to said input terminals for sensing an off-hook voltage condition on said telephone line to produce an off-hook signal;

current sensing means coupled to said input terminals for sensing an off-hook current flow on said telephone line to produce an off-hook signal;

remote start sensing means coupled to said input terminals for sensing a simulated off-hook signal;

selector means coupled to said voltage, current, and remote start sensing means for selectively applying to said telecommunications logger an off-hook signal to enable the recording of audio signals by said logger; and amplifier means coupled to said input terminals for applying received audio signals to said recording channel of said telecommunications logger for recording.

13. The apparatus of claim 12 wherein said selector means comprises plural position switch means for selecting one of said off-hook signals to be applied to said logger.

14. The apparatus of claim 13 wherein said plural position switch means comprises jumper means including plural inputs coupled to receive said off-hook signals, a common output, and a jumper connection for selectively connecting said common output to one of said inputs.

15. The apparatus of claim 12 wherein said input terminals comprises tip and ring inputs for connection to the tip and ring leads of a telephone line or to the leads of another communications link and an auxiliary input for connection to an auxiliary ring lead of a telephone line and additionally adapted to receive said simulated off-hook signal.

16. The apparatus of claim 12 wherein said amplifier means comprises a mute amplifier having a mute terminal for receiving a mute signal to disable the operation of said amplifier means; and further including means for supplying the off-hook signal provided by said selector means to said mute terminal, whereby a mute signal is supplied to said amplifier means in the absence of an off-hook signal.

17. The apparatus of claim 12 further comprising selective attenuating means coupled to said amplifier means for selectively attenuating the audio signals applied to said recording channel.

18. The apparatus of claim 17 wherein said selective attenuating means comprises voltage divider means coupled to an input of said amplifier means; and means for selecting the voltage divider ratio of said voltage divider means.

19. The apparatus of claim 12 wherein said voltage sensing means comprises analog gating means coupled to said input terminals for gating the voltage on said tip and ring leads; means for providing a reference voltage; and comparator means coupled to said analog gating means for comparing the gated voltage to said reference voltage to produce said off-hook signal.

* * * * *